(12) United States Patent
Hu et al.

(10) Patent No.: US 10,313,734 B1
(45) Date of Patent: *Jun. 4, 2019

(54) SWITCHING CONTENT

(71) Applicant: Conviva Inc., Foster City, CA (US)

(72) Inventors: Ningning Hu, Santa Clara, CA (US); John W. Heffner, San Mateo, CA (US); Mei-Hsuan Lu, Foster City, CA (US); Aditya Ravikumar Ganjam, San Francisco, CA (US); Ion Stoica, Piedmont, CA (US)

(73) Assignee: Conviva Inc., Foster City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/883,533

(22) Filed: Oct. 14, 2015

Related U.S. Application Data

(63) Continuation of application No. 13/767,220, filed on Feb. 14, 2013, now Pat. No. 9,204,061, which is a continuation of application No. 12/730,056, filed on Mar. 23, 2010, now Pat. No. 8,402,494.

(60) Provisional application No. 61/210,928, filed on Mar. 23, 2009.

(51) Int. Cl.
| | |
|---|---|
| *H04N 21/43* | (2011.01) |
| *H04H 20/10* | (2008.01) |
| *H04N 21/845* | (2011.01) |
| *H04N 21/20* | (2011.01) |
| *H04N 21/234* | (2011.01) |
| *H04N 21/462* | (2011.01) |
| *H04N 5/268* | (2006.01) |

(52) U.S. Cl.
CPC ........ *H04N 21/4307* (2013.01); *H04H 20/10* (2013.01); *H04N 5/268* (2013.01); *H04N 21/20* (2013.01); *H04N 21/234* (2013.01); *H04N 21/4622* (2013.01); *H04N 21/8455* (2013.01); *H04N 21/8456* (2013.01)

(58) Field of Classification Search
None
See application file for complete search history.

(56) References Cited

U.S. PATENT DOCUMENTS

| | | | |
|---|---|---|---|
| 5,926,204 | A | 7/1999 | Mayer |
| 5,930,473 | A | 7/1999 | Teng et al. |
| 5,987,621 | A | 11/1999 | Duso |

(Continued)

OTHER PUBLICATIONS

"Relay Nodes in Wireless Sensor Networks: A Survey"—Ataul Bari, University of Windsor, Nov. 2005, http://richard.myweb.cs.uwindsor.ca/cs510/survey_bari.pdf.

(Continued)

*Primary Examiner* — Justin E Shepard
(74) *Attorney, Agent, or Firm* — Van Pelt, Yi & James LLP

(57) ABSTRACT

Displaying video on a video display device is disclosed. A first video stream from a first video streaming source is displayed on the display device. A second video stream from a second video streaming source is processed on the display device without displaying the second video stream. Displaying the first video stream is ceased and instead the second video stream is displayed. Supporting operations on a video stream is also disclosed. At least one video chunk is received at a first granularity. A determination is made that an operation is to be performed at a different granularity. At least one video chunk is requested at the different granularity.

37 Claims, 7 Drawing Sheets

(56) References Cited

U.S. PATENT DOCUMENTS

| | | | |
|---|---|---|---|
| 6,026,077 A | 2/2000 | Iwata | |
| 6,208,977 B1 | 3/2001 | Hernandez | |
| 6,279,039 B1 | 8/2001 | Bhat | |
| 6,377,996 B1 | 4/2002 | Lumelsky | |
| 6,405,251 B1 | 6/2002 | Bullard | |
| 6,438,592 B1 | 8/2002 | Killian | |
| 6,470,389 B1 | 10/2002 | Chung | |
| 6,711,622 B1 | 3/2004 | Fuller | |
| 6,735,630 B1 | 5/2004 | Gelvin | |
| 6,754,833 B1 | 6/2004 | Black | |
| 6,836,691 B1 | 12/2004 | Stirton | |
| 6,892,236 B1 | 5/2005 | Conrad | |
| 6,892,307 B1 | 5/2005 | Wood | |
| 6,906,743 B1 * | 6/2005 | Maurer | H04N 7/0112 348/180 |
| 6,950,855 B2 | 9/2005 | Sampathkumar | |
| 7,006,666 B2 * | 2/2006 | Montgomery | G06T 7/2053 348/143 |
| 7,010,598 B2 | 3/2006 | Sitaraman | |
| 7,020,082 B2 | 3/2006 | Bhagavath | |
| 7,024,452 B1 | 4/2006 | O'Connell, Jr. | |
| 7,024,468 B1 | 4/2006 | Meyer | |
| 7,039,694 B2 | 5/2006 | Kampe | |
| 7,092,696 B1 | 8/2006 | Hosain | |
| 7,139,834 B1 | 11/2006 | Albanese | |
| 7,159,234 B1 | 1/2007 | Murphy | |
| 7,222,190 B2 | 5/2007 | Klinker | |
| 7,277,896 B2 | 10/2007 | Matsubara | |
| 7,356,341 B2 | 4/2008 | Nanda | |
| 7,367,044 B2 | 4/2008 | Fowler | |
| 7,373,415 B1 | 5/2008 | Deshan | |
| 7,490,136 B2 | 2/2009 | Suzuki | |
| 7,574,488 B2 | 8/2009 | Matsubara | |
| 7,599,698 B2 | 10/2009 | Cheng | |
| 7,617,525 B1 | 11/2009 | Moeck | |
| 7,627,872 B2 | 12/2009 | Hebeler et al. | |
| 7,668,914 B2 * | 2/2010 | Parker | H04N 7/17318 370/256 |
| 7,689,485 B2 | 3/2010 | Kanekar | |
| 7,813,326 B1 | 10/2010 | Kelm | |
| 7,904,580 B2 | 3/2011 | Mandera et al. | |
| 7,941,823 B2 | 5/2011 | Hasek | |
| 8,028,159 B2 | 9/2011 | Li | |
| 8,038,535 B2 | 10/2011 | Jensen | |
| 8,135,855 B2 | 3/2012 | Sitaraman | |
| 8,230,105 B2 | 7/2012 | Melnyk et al. | |
| 8,234,350 B1 | 7/2012 | Gu | |
| 8,370,887 B2 | 2/2013 | Virdi et al. | |
| 8,387,094 B1 | 2/2013 | Ho | |
| 8,484,319 B2 | 7/2013 | Wein | |
| 8,489,923 B1 | 7/2013 | Lakshminarayanan | |
| 8,589,473 B2 | 11/2013 | Bruss | |
| 8,683,066 B2 | 3/2014 | Hurst | |
| 8,751,605 B1 | 6/2014 | Zhang | |
| 8,751,679 B2 | 6/2014 | McHugh | |
| 8,874,964 B1 | 10/2014 | Lakshminarayanan | |
| 8,898,338 B1 | 11/2014 | McGowan | |
| 8,924,996 B2 | 12/2014 | Shafiee | |
| 8,930,991 B2 | 1/2015 | Philpott | |
| 8,943,170 B2 | 1/2015 | Li | |
| 8,954,491 B1 | 2/2015 | Medved | |
| 9,100,288 B1 | 8/2015 | Ganjam | |
| 9,456,015 B2 | 9/2016 | Chen | |
| 9,549,043 B1 | 1/2017 | Stoica | |
| 9,613,042 B1 | 4/2017 | Joseph | |
| 9,819,566 B1 | 11/2017 | Ganjam | |
| 2002/0002708 A1 * | 1/2002 | Arye | H04N 21/23424 725/95 |
| 2002/0016831 A1 | 2/2002 | Peled | |
| 2002/0082730 A1 * | 6/2002 | Capps | H04N 21/40 700/94 |
| 2002/0095400 A1 | 7/2002 | Johnson | |
| 2002/0126135 A1 | 9/2002 | Ball | |
| 2002/0141343 A1 | 10/2002 | Bays | |
| 2002/0143798 A1 | 10/2002 | Lisiecki | |
| 2002/0175934 A1 | 11/2002 | Hand | |
| 2002/0183972 A1 | 12/2002 | Enck | |
| 2002/0198984 A1 | 12/2002 | Goldstein et al. | |
| 2003/0046396 A1 | 3/2003 | Richter | |
| 2003/0046704 A1 | 3/2003 | Laksono et al. | |
| 2003/0050966 A1 | 3/2003 | Dutta | |
| 2003/0061305 A1 | 3/2003 | Copley et al. | |
| 2003/0061356 A1 | 3/2003 | Jason, Jr. | |
| 2003/0065739 A1 | 4/2003 | Shnier | |
| 2003/0084003 A1 | 5/2003 | Pinkas | |
| 2003/0105850 A1 | 6/2003 | Lean | |
| 2003/0140108 A1 | 7/2003 | Sampathkumar | |
| 2003/0140180 A1 | 7/2003 | Brown | |
| 2003/0145066 A1 | 7/2003 | Okada | |
| 2003/0169863 A1 | 9/2003 | Hernandez | |
| 2003/0204613 A1 | 10/2003 | Hudson | |
| 2004/0010544 A1 | 1/2004 | Slater | |
| 2004/0019675 A1 | 1/2004 | Hebeler et al. | |
| 2004/0047354 A1 | 3/2004 | Slater | |
| 2004/0057420 A1 | 3/2004 | Curcio | |
| 2004/0064556 A1 | 4/2004 | Zhang | |
| 2004/0133471 A1 | 4/2004 | Henderson et al. | |
| 2004/0093155 A1 | 5/2004 | Simonds | |
| 2004/0107387 A1 | 6/2004 | Larsson et al. | |
| 2004/0128682 A1 | 7/2004 | Liga | |
| 2004/0158643 A1 | 8/2004 | Suzuki | |
| 2004/0162901 A1 | 8/2004 | Mangipudi | |
| 2004/0187159 A1 | 9/2004 | Gaydos | |
| 2004/0193716 A1 | 9/2004 | McConnell | |
| 2004/0233918 A1 | 11/2004 | Larsson | |
| 2004/0236846 A1 | 11/2004 | Alvarez et al. | |
| 2004/0267691 A1 | 12/2004 | Vasudeva | |
| 2005/0010915 A1 | 1/2005 | Chen | |
| 2005/0021715 A1 | 1/2005 | Dugatkin | |
| 2005/0060158 A1 | 3/2005 | Endo et al. | |
| 2005/0086300 A1 | 4/2005 | Yeager | |
| 2005/0086469 A1 | 4/2005 | Dunagan | |
| 2005/0120131 A1 | 6/2005 | Allen | |
| 2005/0169179 A1 | 8/2005 | Antal | |
| 2005/0183120 A1 * | 8/2005 | Jain | H04N 7/17336 725/46 |
| 2005/0243735 A1 | 11/2005 | Kashima | |
| 2005/0251835 A1 * | 11/2005 | Scott, III | H04N 7/17318 725/88 |
| 2005/0278259 A1 | 12/2005 | Gunaseelan | |
| 2006/0052100 A1 | 3/2006 | Almgren | |
| 2006/0059248 A1 | 3/2006 | Ikeda | |
| 2006/0135172 A1 | 6/2006 | Dronne | |
| 2006/0136597 A1 | 6/2006 | Shabtai | |
| 2006/0143350 A1 | 6/2006 | Miloushev | |
| 2006/0168304 A1 | 7/2006 | Bauer | |
| 2006/0206539 A1 | 9/2006 | Thompson | |
| 2006/0236017 A1 | 10/2006 | Rooholamini | |
| 2006/0285489 A1 | 12/2006 | Francisco | |
| 2007/0005809 A1 | 1/2007 | Kobayashi | |
| 2007/0025381 A1 | 2/2007 | Feng | |
| 2007/0041584 A1 | 2/2007 | O'Connor | |
| 2007/0101202 A1 | 5/2007 | Garbow | |
| 2007/0136311 A1 | 6/2007 | Kasten | |
| 2007/0140113 A1 | 6/2007 | Gemelos | |
| 2007/0198413 A1 | 8/2007 | Nagao | |
| 2007/0204011 A1 * | 8/2007 | Shaver | H04N 21/6543 709/219 |
| 2007/0250560 A1 | 10/2007 | Wein | |
| 2007/0286351 A1 | 12/2007 | Ethier et al. | |
| 2007/0288638 A1 | 12/2007 | Vuong | |
| 2008/0016205 A1 | 1/2008 | Svendsen | |
| 2008/0037438 A1 | 2/2008 | Twiss | |
| 2008/0046499 A1 | 2/2008 | Cabrera | |
| 2008/0046974 A1 | 2/2008 | Minodier | |
| 2008/0049616 A1 | 2/2008 | Kamath et al. | |
| 2008/0049786 A1 | 2/2008 | Ram et al. | |
| 2008/0063195 A1 | 3/2008 | Li | |
| 2008/0096562 A1 | 4/2008 | Wu | |
| 2008/0104454 A1 | 5/2008 | White | |
| 2008/0112315 A1 | 5/2008 | Hu et al. | |
| 2008/0151821 A1 | 6/2008 | Cho | |

(56) References Cited

U.S. PATENT DOCUMENTS

| | | | |
|---|---|---|---|
| 2008/0155586 A1* | 6/2008 | Yang | H04N 5/46 725/32 |
| 2008/0195461 A1 | 8/2008 | Li | |
| 2008/0209499 A1* | 8/2008 | Ramesh | H04H 20/26 725/138 |
| 2008/0215718 A1 | 9/2008 | Stolorz | |
| 2008/0247326 A1* | 10/2008 | Cormier | H04L 63/0272 370/252 |
| 2008/0263180 A1 | 10/2008 | Hurst | |
| 2009/0019503 A1* | 1/2009 | Vorbau | G06F 17/30873 725/109 |
| 2009/0059812 A1 | 3/2009 | Chinnaswamy | |
| 2009/0106392 A1 | 4/2009 | Zuckerman | |
| 2009/0164656 A1 | 6/2009 | Guan | |
| 2009/0172200 A1* | 7/2009 | Morrison | G10H 1/0058 709/248 |
| 2009/0187956 A1* | 7/2009 | Sommer | H04N 7/173 725/106 |
| 2009/0248872 A1 | 10/2009 | Luzzatti | |
| 2009/0271101 A1 | 10/2009 | Relyea | |
| 2009/0327489 A1 | 12/2009 | Swildens | |
| 2009/0328124 A1* | 12/2009 | Khouzam | H04N 21/23435 725/116 |
| 2010/0043014 A1 | 2/2010 | Hebeler et al. | |
| 2010/0080290 A1 | 4/2010 | Mehrotra | |
| 2010/0114562 A1 | 5/2010 | Hutchinson | |
| 2010/0125675 A1 | 5/2010 | Richardson | |
| 2010/0169195 A1 | 7/2010 | Trest | |
| 2010/0241701 A1 | 9/2010 | Lester | |
| 2010/0302002 A1 | 12/2010 | Guo | |
| 2010/0306368 A1 | 12/2010 | Gagliardi | |
| 2011/0047413 A1 | 2/2011 | McGill | |
| 2011/0082946 A1 | 4/2011 | Gopalakrishnan | |
| 2011/0196943 A1 | 8/2011 | Bornstein | |
| 2011/0202593 A1 | 8/2011 | Vaderna | |
| 2011/0296048 A1 | 12/2011 | Knox | |
| 2012/0110167 A1 | 5/2012 | Joch | |
| 2012/0173753 A1 | 7/2012 | Moorthy | |
| 2012/0178426 A1 | 7/2012 | Filipov | |
| 2012/0204068 A1 | 8/2012 | Ye et al. | |
| 2012/0226734 A1 | 9/2012 | Poese | |
| 2012/0240176 A1 | 9/2012 | Ma | |
| 2013/0094445 A1 | 4/2013 | De Foy | |
| 2013/0132605 A1 | 5/2013 | Kocks | |
| 2013/0142129 A1 | 6/2013 | Rinne | |
| 2013/0198328 A1 | 8/2013 | Green et al. | |
| 2013/0305299 A1 | 11/2013 | Bergstrom | |
| 2014/0108671 A1 | 4/2014 | Watson | |
| 2014/0198641 A1 | 7/2014 | Perkuhn | |
| 2014/0330980 A1 | 11/2014 | Richardson | |
| 2015/0026239 A1 | 1/2015 | Hofmann | |
| 2016/0234293 A1 | 8/2016 | Berger | |

OTHER PUBLICATIONS

"Simple Opportunistic Routing Protocol for Wireless Mesh Networks"—Rozner et al, University of Texas at Austin, Aug. 2011 http://ericrozner.com/papers/wimesh06.pdf.

http://www.cs.berkeley.edu/~kubitron/articles/techreview.pdf "The Internet Reborn"—Wade Roush, Technology Review, Oct. 2003.

Elo et al., "Virtual URLs for Browsing & Searching Large Information Spaces", WebNet Journal, pp. 38-43, p. 66, Jan.-Mar. 1999.

"Firefly-Inspired Heartbeat Synchronization in Overlay Networks"—Binci et al., University of Bologna, Italy, Feb. 2007 http://www.cs.unibo.it/babaoglu/courses/cas06-07/papers/pdf/fireflies.pdf.

* cited by examiner

```
function chunk_switching1() {
    if (chunk[i].switching_point -
chunk[i].pht < alpha) {
        chunk[i].stop();
        chunk[i+1].play()
    }
}
```

FIG. 4

```
function chunk_switching2() {
   if (chunk[i].cuepoint) {
      chunk[i+1].play();
   }
   // estimate pht of chunk[i+1]
   wait for chunk[i+1].pht to change k times to compute
chunk[i+1].est_pht;
   chunk[i+1].pause();
   // chunk[i] and chunk[i+1] almost in sync...
   if (chunk[i+1].est_pht - chunk[i].est_pht < beta)
      // restart chunk[i+1]
      chunk[i+1].resume();
repeat {
      // make sure that chunk[i] and chunk[i+1] are
really in sync...
      wait for chunk[i+1].pht to change k times to
compute chunk[i+1].est_pht;
      if (chunk[i+1].est_pht - chunk[i].est_pht > delta)
         // chun[i+1] is still a bit ahead of chun[i]
         pause chunk[i+1] for one time interval;
      else
         // complete the switch
         chunk[i].stop();
}
```

SWITCHING CONTENT

CROSS REFERENCE TO OTHER APPLICATIONS

This application is a continuation of co-pending U.S. patent application Ser. No. 13/767,220 entitled SWITCHING CONTENT filed Feb. 14, 2013, which is a continuation of U.S. patent application Ser. No. 12/730,056 entitled SWITCHING CONTENT filed Mar. 23, 2010, now U.S. Pat. No. 8,402,494, which claims priority to U.S. Provisional Patent Application No. 61/210,928 entitled SEAMLESS SWITCHING FOR STREAMING CONTENT filed Mar. 23, 2009, which are incorporated herein by reference for all purposes.

BACKGROUND OF THE INVENTION

Individuals are increasingly using client machines to access content, such as video files and live streaming/video-on-demand content, via the Internet or other networks. Players for such content are typically built using standard commercially available platforms such as Adobe Flash or Microsoft Silverlight. In some cases, such as where the client machine is included in an enterprise environment, or due to parental or other controls, users are restricted in some of the actions that they can take with respect to the client machines. As one example, users may be prohibited from installing software applications for security or other policy reasons. Unfortunately, if the platform does not natively provide certain player functionality, it can be difficult to provide that functionality without requiring the installation of a plugin or modifying the source of the content.

BRIEF DESCRIPTION OF THE DRAWINGS

Various embodiments of the invention are disclosed in the following detailed description and the accompanying drawings.

FIG. 4 illustrates an example of pseudo code for implanting chunk switching.

FIG. 5 illustrates an example of pseudo code for implanting chunk switching.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
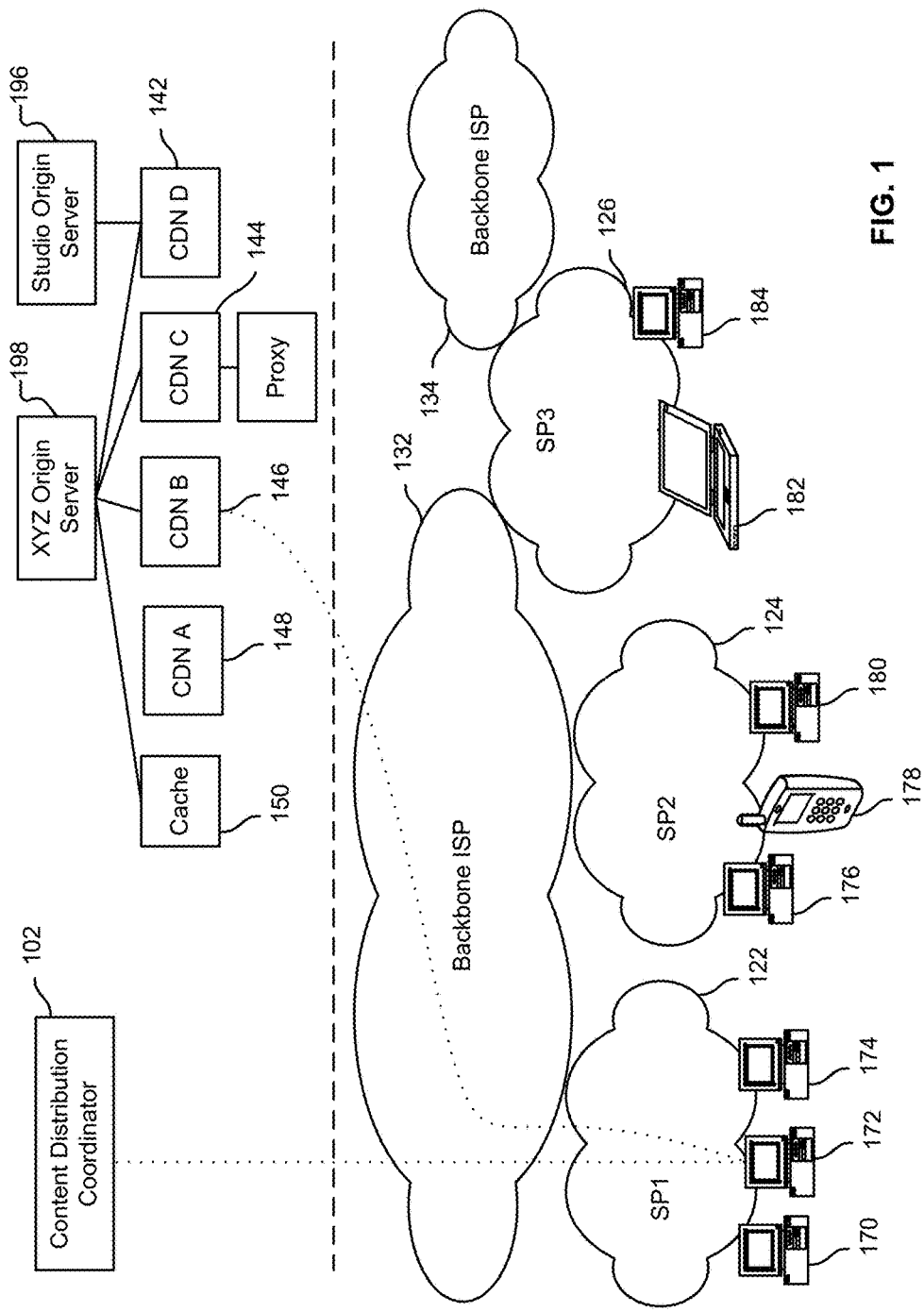
FIG. 1 is an illustration of an environment in which content is distributed.

FIG. 1 is an illustration of an environment in which content is distributed. In the example shown, clients 170-184 are used to access content, such as audiovisual content (e.g., movies, songs, television shows, sporting events, games, images, etc.) that is owned by content owners. The content is stored (or captured) at origin servers 196-198, then distributed via other servers, caches, content distribution networks (CDNs), proxies, etc. (collectively, "content sources"). Content sources employ a variety of technologies and include HTTP, Adobe Flash Media, and Microsoft Internet Information Service servers. In some embodiments content is also distributed by clients (e.g., using peer-to-peer techniques).

Examples of clients include personal computers (170), laptops (182), cellular phones/personal digital assistants (178), and other types of information appliances (not shown) such as set-top boxes, game consoles, broadband routers, file servers, video servers, and digital video recorders, as applicable. The clients shown are used by subscribers to various Internet service providers (ISPs). For example, clients 170, 172, and 174 are subscribed to SP1 (122), while clients 176, 178, and 180 are subscribed to SP2 (124), and clients 182 and 184 are subscribed to SP3 (126).

In the example shown, a movie studio ("Studio") has contracted with content distributor 142 to provide downloadable copies of its films in exchange for a fee. Similarly, a television network ("XYZ") has contracted with content distributors 142-148 to provide viewers with access to live streams of its broadcasts as well as streams of television show episodes and sporting events. In some cases, the content distributor is owned/operated by the content owner.

Content distributor 142 has a data center that is provided with network access by backbone ISP 132. Though represented here by a single node (also referred to herein as a "CDN node"), content distributor 142 may typically have multiple data centers (not shown) and may make use of multiple backbone or other ISPs. Content distributor 144 has a data center that is provided with network access by backbone ISP 134.

Suppose a user of client 172 (hereinafter "Alice") would like to watch a live soccer game owned by XYZ. Client 172 includes a web browser application. Alice uses the web browser application to navigate to a portal owned by XYZ, such as "http://xyztvnetwork.com/livegames." Her request for the game is directed to a CDN node that is closest to her.

In this case, CDN 146 is the fewest hops away from her client. Her client then begins streaming the content from CDN 146, which is in turn rendered in her browser (e.g., via a Flash or Silverlight player).

In addition to CDN 146, Alice's client is also in communication with content distribution coordinator 102. Content distribution coordinator 102 periodically exchanges information with clients using messages referred to herein as heartbeat messages. Content distribution coordinator 102 provides instructions to clients that indicate the node(s) from which they should obtain the appropriate stream data (and/or as applicable the node(s) to which they should send stream data). Clients send content distribution coordinator 102 information such as current CPU load, available storage, and geographic location of the client. Clients can also send status information that describes the quality of the user experience, such as the length of time it takes for the soccer game video to start playing, the number of buffering events (if any), the length of buffering events, and the number of frames per second rendered by the video player. Content distribution center 102 uses the received information to maintain a global and up-to-date view of various portions of the environment shown in FIG. 1.

As other users of clients 170-184 request content, their respective players similarly obtain content from content sources such as CDN 144 and also communicate with content distribution coordinator 102. Such players may be browser-based as with Alice's, or they may be standalone applications, as applicable. Content distribution coordinator 102 collects and processes the information received from Alice's client along with other clients. The collected information can be used to detect and remedy problems in the content distribution. Examples of such problems include excessive buffering, freezing, and frame skipping.

In the example shown in FIG. 1, a single content distribution coordinator 102 is used. Portions of content distribution coordinator 102 may be provided by and/or replicated across various other modules or infrastructure depending, for example, on factors such as scalability and availability (reducing the likelihood of having a single point of failure), and the techniques described herein may be adapted accordingly. In some embodiments content distribution coordinator 102 is implemented across a set of machines distributed among several data centers. A Resilience Service Layer (RSL) can also be used to ensure that the monitoring service is not disrupted when/if a subset of machines fail or a subset of data centers hosting the content distribution monitor are disconnected from the Internet.

Switching Content

Alice's client (172) is initially assigned CDN 146 as a source of the soccer game. However, as the game progresses, content distribution coordinator 102 may instruct client 172 to change the source from CDN 146 to a different source. One reason that client 172 could be so instructed is if the content distribution monitor determines that excessive congestion is occurring with respect to CDN 146, while CDN 148 has spare bandwidth. In that case, content distribution coordinator 102 would instruct client 172 to obtain the game from CDN 148. As another example, client 172 can be instructed to switch for cost reasons. For example, client 172 can be instructed to switch from CDN 146 (which delivers content via RTMP) to CDN 148 (which delivers content via HTTP). Client 172 can also be instructed to switch from CDN 146 to client 184 as a source of content if client 184 is configured to act as a peer and uses a peer-to-peer protocol to transfer content.

Instead of or in addition to assigning new content sources, content distribution coordinator 102 can also instruct clients to switch between different content streams provided by the same source. As one example, suppose a user of client 180 (hereinafter "Bob") initially fetches a movie from CDN 142, in high quality, at a bitrate of 1 Mbps. As Bob watches the movie, the quality of his viewing experience degrades (e.g., due to other users of his DSL connection also watching movies or due to his CPU being overloaded). Content distribution coordinator 102 is configured to instruct client 180 to switch from the higher quality video to a lower quality video (e.g., at a bitrate of 300 kbps). As another example, Alice may initially receive a low quality video feed of the game and then be instructed to switch to a higher quality feed (either on the same CDN or a different CDN) once it is determined that client 172 is able to maintain the higher quality feed.

In various embodiments, rather than instructing clients to switch sources, content distribution coordinator 102 is configured to provide clients with recommendations and the clients include logic to make an ultimate decision of whether to switch.

As will be explained in more detail below, using the techniques described herein, when a client switches from one video feed to another, the ability of a user of the client to perceive the switch is minimized and in some cases not present.

Player Architecture

Client 172 is a typical commodity desktop computer running the Windows 7 operating system and, as explained above, has a web browser application installed. Also installed on client 172 is the Adobe Flash platform, which includes a video player. Other platforms can also be installed on clients (such as Microsoft Silverlight) and the techniques described herein adapted to work with them, as applicable.

The video player supports a scripting language (e.g., ActionScript for Flash, and C# for Silverlight) which allows developers to write programs that control the behavior of instances of the video player, such as instructing the video player to play a particular stream (e.g., provided by CDN 146), to pause or resume playing a stream, and to control the audio level of the stream.

When Alice directs her browser to the video portal provided by XYZ, a script (to control the video player) is dynamically, transparently downloaded, meaning that Alice is not prompted to approve or install the script. The script is a meta-player that controls the underlying Flash (or Silverlight) player.

Switching Between Two Video Streams

As mentioned above, when Alice first indicates interest in watching the soccer game (e.g., by selecting a "watch now" button provided by the portal), client 172 is directed to stream the content from CDN 146. Content is delivered to Alice as a series of 30 second video chunks. Content sources store the video chunks (which have associated chunk identifiers), and in some cases store multiple copies of the content (e.g., encoded with various bitrates and/or as chunks of different sizes). The meta-player instructs an instance of the video player to play the chunks one by one.

If a problem is detected in the playback (e.g., due to a change in a network condition or CPU overuse), the meta-player is configured to retrieve the content (e.g., based on chunk identifiers) from another source, or to choose a different quality stream from the same source, as applicable. In some embodiments the meta-player switches content sources based on an instruction provided by content distribution coordinator 102. In other embodiments, the meta-player includes logic that allows it to participate in the switching decision.

Starting to play a video chunk from a new source in the video player will likely involve a non-trivial overhead, such as player initialization, establishing a connection to the source, and filling a player buffer. Accordingly, if the content meta-player is configured to display the soccer game using a single instance of the Flash video player, it is possible that Alice will see a potentially lengthy glitch during the time it takes the player to switch video chunk sources. In some embodiments, such glitches are prevented from being perceived by Alice through the use of two (or more) instances of the video player—one of which is shown to Alice, and one of which is hidden from Alice's view at any given time.

Figure 2:
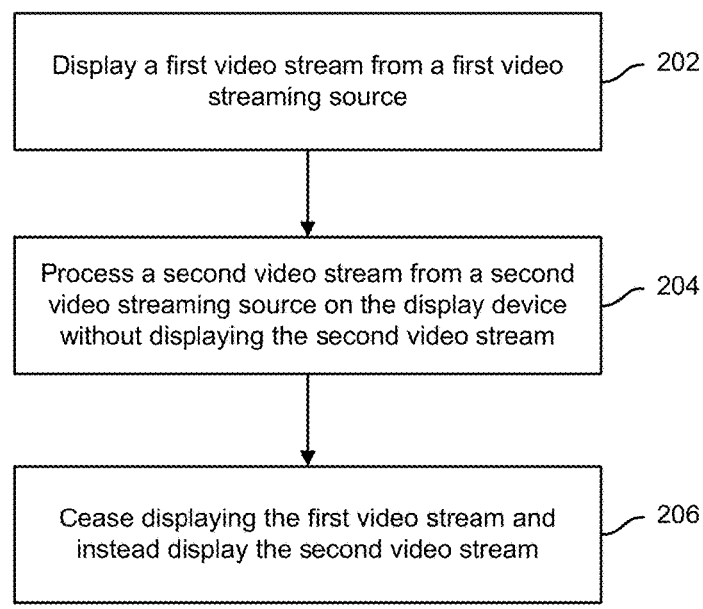
FIG. 2 illustrates an embodiment of a process for displaying video on a video display device.

FIG. 2 illustrates an embodiment of a process for displaying video on a video display device. In some embodiments the process shown in FIG. 2 is performed by client 172. The process begins at 202 when a first video stream from a first video streaming source is displayed. As one example, at 202, video chunks of the soccer game are received by client 172 and sequentially rendered by Alice's video player.

At 204, a second video stream from a second video streaming source is processed on the display device, but not displayed. As one example of the processing performed at 204, suppose that after rendering several chunks of the soccer game for Alice, content distribution coordinator 102 determines that it would be less expensive to deliver the game to Alice via CDN 148 than to continue delivering it via CDN 146. At 204, the meta-player script begins fetching chunks of the soccer game in a second instance of the video player. Both players are configured to display the video game in the same region of Alice's screen. However, at any given time, only one player will display video in that region. Initially, the first instance of the player continues to display the soccer game, while the second player establishes a connection to CDN 148 and begins fetching video chunks of its own.

At 206, the first video stream ceases being displayed and the second video stream is instead displayed. For example, at 206, at an appropriate time, the meta-player script instructs the first instance of the player to hide (and mute its audio) and instructs the second instance of the player to become visible (and unmute its audio). In this scenario, the first instance of the player is streaming content using one protocol (RTMP) and the second instance of the player is streaming content using a second protocol (HTTP). As another example of the two streams using two different protocols, suppose CDN 142 is configured to provide content via two protocols, RTMP and RTMPE. The RTMPE protocol supports encryption but does not scale as well as the RTMP protocol. Studio is concerned that viewers of its content such as Bob might make unauthorized copies of its movies. While it could exclusively stream its movies using RTMPE, Studio could also provide instructions (e.g., via its own meta-player script) to Bob's client that one out of every ten video chunks should be obtained via RTMPE while the other nine should be obtained via RTMP. In this scenario, the first video player instance would be configured to play nine such chunks in a row, and then hide, while the second video player plays the tenth chunk and then hides. Once the second player instance is finished, the first player instance is made visible and plays an additional nine video chunks, and so on.

Synchronizing Two Video Streams

As mentioned above, starting to play a video chunk can incur a non-trivial overhead which may lead to glitches that visible to the user. When two player instances are used, such glitches are minimized when compared to a single player instance. In some embodiments, glitches are further minimized and in some cases eliminated through the use of synchronization techniques.

Example—Using Cue Points

Figure 3:
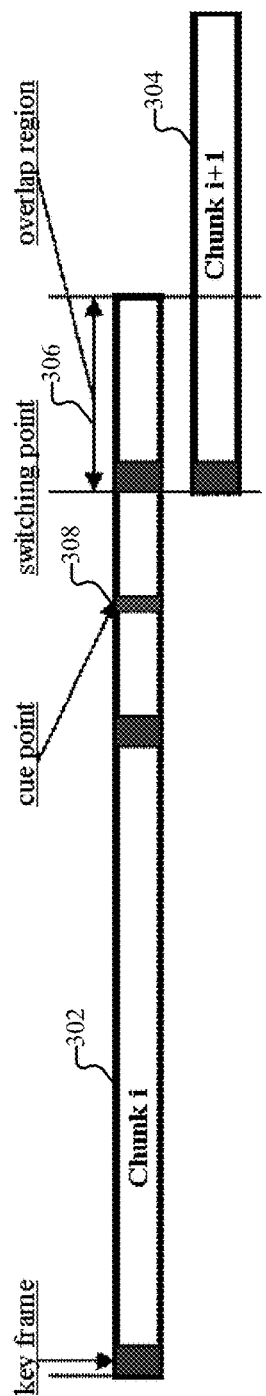
FIG. 3 illustrates an example of two video chunks.

FIG. 3 illustrates an example of two video chunks. In the example shown, each video chunk shares an overlap with its subsequent chunk by a time interval referred to herein as the overlap region. For example, chunk 302 (also denoted "chunk i") overlaps with chunk 304 (also denoted "chunk i+1") by a one second time interval (306). The meta-player script is configured to use the overlap region to synchronize the current and the next video chunk, which are to be played by the respective first and second instances of the video player. Once the chunks are synchronized, the meta-player initiates the switch (e.g. instructing the first instance to hide/mute while instructing the second instance to become visible/unmute).

In the example shown in FIG. 3, cue point 308 is a metadata element that contains a timestamp at which the switching between the two video chunks should occur (also referred to herein as a switching point). In some embodiments the switching point corresponds to the timestamp of the first keyframe in the next chunk (e.g., chunk 304 in the example shown in FIG. 3). The cue point can be included at the time the video is encoded, and can also be included by a time-stamping device that is downstream of the encoder.

FIG. 4 illustrates an example of pseudocode for implementing chunk switching. When the first player instance reaches cue point 308, the meta-player script begins monitoring the difference between the timestamp of the chunk 302's frame currently playing and the switching point. When this difference becomes less than a small constant alpha, the meta-player instructs the second player instance to start playing chunk 304. In some embodiments, the meta-player uses the play head time ("pht") variable to monitor the timestamp of the frame currently being played. The alpha constant captures the delay between the time the play command is issued and the time it takes for the first frame of the chunk to actually play.

In some embodiments, to improve the accuracy of the pht readings, a fitting algorithm such as linear regression is used to estimate the actual pht value. FIG. 5 illustrates an example of pseudo code for implementing chunk switching. In the example shown, k pht readings are used to compute an accurate estimate of pht ("est_pht").

Similar to the pseudo code provided in FIG. 4, once the first player instance reaches the cue point of chunk 302, the meta-player instructs the second player instance to start playing chunk 304. The meta-player monitors the pht of chunk 304 for k changes, and uses these k values to compute a fit for pht. It then uses this fit to estimate the actual value of est_pht. Next, the meta-player instructs the second player instance to stop playing chunk 304 (e.g., to pause) and wait until the difference between the estimated pht of chunk 304 and the estimated pht of chunk 302 is smaller than a positive constant beta, where beta is typically equal with inter-frame interval. Further, the meta-player continues to estimate and compare the pht of chunk 304 with the estimated pht of chunk 302. As long as the difference is larger than a constant delta, where delta is smaller than the inter-frame interval, chunk 304 is paused for a very short interval of time. As soon as the difference becomes smaller than delta, the meta-player completes chunk switching: chunk 302 is stopped and the window controlled by the second player instance, which plays chunk 304, becomes visible.

Example—Fingerprints

In the example shown in FIG. 3, cue points were added to the chunks by an encoder. Other techniques can also be used to assist in synchronizing to video feeds when cue points are not available. For example, a portion of the first video chunk can be fingerprinted according to one of the schemes described below. Once the fingerprint is located in the second chunk, the synchronization point can be found by identifying the offset between the two streams. Techniques for identifying the offset can vary based on factors such as which fingerprint scheme is used and whether the switch is between chunks having the same or different bit rates.

Fingerprint Scheme—Compressed Frame Sizes

Typically, the size of a compressed frame is highly dependent on the video content. One way to implement fingerprinting is to use a moving window over a sequence of N frames. The fingerprint is defined by the sequence of the frame sizes in a given window. Since this method only looks at the frame sizes, it requires little CPU overhead.

One way to compute the offset between two streams based on their fingerprint is to use mean absolute error or cross-correlation. While the first stream is playing (e.g. streamed from CDN 144 in the first player instance), the second stream (e.g. streamed from CDN 146) is started. Once the new stream has played for two seconds, data (e.g., bytes per compressed frame) is collected every 30 ms, for both streams, for 8 seconds. After the data collection, the mean absolute error is computed between the two streams starting with an offset of zero and then shifted for each sample. The shift is done with both the first stream and the second stream. Shifting the second stream forward handles the case where the second stream is ahead of the first stream. Shifting the first stream forward handles the case where the first stream is ahead of the second stream. A minimum overlap of 4 seconds is required between the two streams to compute the mean absolute error reliably. In the case where the switch is between two different bit rates, cross-correlation is used instead of mean absolute error since the scale of the values is different. If the average of the mean absolute errors for all offsets normalized by bit rate is too large, then the measurement is repeated up to three times. The threshold of "too large" can be set by offline experiments or using an online learning algorithm. For example, anomaly detection can be performed over a stored history of values across video sessions and across clients. The offset between the two streams is the value with the minimum mean absolute error. Once computed the offset is used to compensate for the delay in starting the re-buffering for actual playback. One way this can be done is by estimating the round-trip time to the server and adding this to the offset. If the stream buffers in the middle of this measurement, the measurement is repeated from the start up to three times.

In some embodiments, if the video being fingerprinted is generated by the same encoder, one can use the hash on each compressed frame as a signature. In this case the offset is identified by locating the same frame in the two streams by comparing the hashes.

Additional Fingerprint Schemes

Decompressed frame bit maps can also be used to fingerprint video. A hash (e.g., MD5) of the decompressed video can also be used as signature. In yet another embodiment, the histogram of luminance components (or both luminance and chrominance component) are used for fingerprinting. Other statistics of luminance/chrominance components, such as the first order (mean), the second order (variance), and higher order statistics as the signature of each frame can also be used.

Additional Synchronization Techniques

For Live Content

In the case of live video (e.g., the soccer game), it may not be possible to use "pause" to synchronize a stream that is ahead with another stream. In some embodiments, this situation is remedied by modifying the buffer length to improve the switch.

When a new live stream is played from a Flash RTMP server, a buffer time value (in seconds) is set at the player that instructs the player to begin playing the video only after it has accumulated buffer time amount of video. Live streams start buffering at the current live point. Suppose the current live point is 100 seconds and the buffer time is set to 10 seconds. When a player is started, it will buffer video from time 100 seconds to time 110 seconds and then start playing. Live video is downloaded at stream rate and will thus start playing roughly 10 seconds behind the source (i.e., source will be at 110 seconds when the player starts playing video at 100 seconds). If a buffer time of 5 seconds is used instead, the player is will play roughly 5 seconds behind the source. With this property, a large buffer time can be used first to force a stream into "paused" state. At the time it should be resumed, a smaller buffer time is used to immediately activate the stream into playing state, and synchronization accuracy is improved.

For Video-On-Demand

In some embodiments, once the offset is found, the stream is re-buffered (e.g., using pause and resume) with a buffer time of 30 seconds. A timer is set for the offset value. When the timer elapses, the buffer time is set to a value less than the current buffer length. This triggers the video to start playing immediately. This is more accurate than setting the buffer time to the offset value since bursty traffic may cause the playback to start before or after the offset time.

For Audio

In some embodiments, to make a switch as imperceptible to a human as possible, the volume of the old stream is gradually reduced while the audio of the new stream is gradually increased. This eliminates popping noises that may happen then the switch is made abruptly.

Multi-Resolution Chunks

As mentioned above, content sources can be configured to store copies of the same content using different size chunks. As one example, CDN 142 might store a complete copy of the movie, Robin Hood, in both 30 second and 5 second chunks. In selecting which length chunk should be used, to conflicting requirements are at play. On one hand, long chunks minimize the number of switches and are generally preferred by content server software. On the other hand, shorter chunks allow operations such as "seek" to be performed more quickly. For example, suppose a user wishes to seek to time point 0:26 (twenty six seconds into the video). If the chunk size is 30 seconds, the user will have to wait until all (or virtually all) of the chunk is downloaded before being able to seek to that point. In contrast, if the chunk size is 5 seconds, the client can fetch the chunk that spans time 0:25-0:30 and seek to point 0:26 much more quickly. As another example, smaller chunk sizes allow low end-to-end delay in the context of live streaming and also allow for faster join operations.

In various embodiments, when actions such as seeking within a video-on-demand stream or starting to watch a live stream are taken, the meta-player is configured to request small chunks (e.g., 5 second chunks) and then switch to a longer chunk (e.g., 30 seconds long) once the streaming session is successfully underway. In doing so, both fast seeks and low numbers of switches can be achieved.

Figure 6:
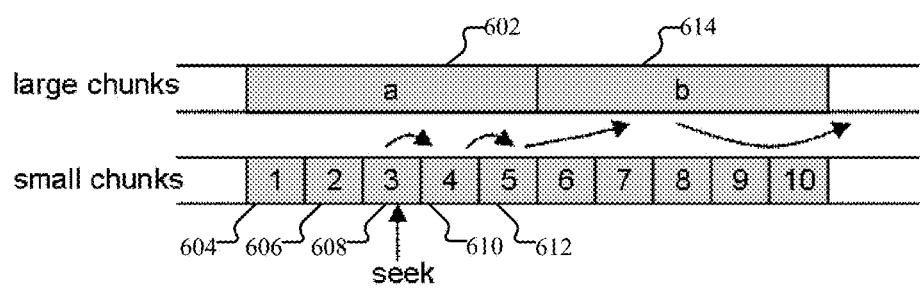
FIG. 6 illustrates an example of a video stream divided into chunks of two different sizes.

FIG. 6 illustrates an example of a video stream divided into chunks of two different sizes. As shown, large chunk 602 contains the same content as chunks 604-612, collectively. Using the techniques herein, when the user performs a seek operation in the middle of chunk 602, the meta-player will first play the small chunks 3, 4, and 5. When it reaches the boundary of chunk "b", the first large chunk, the meta-player will switches to chunk "614."

Figure 7:
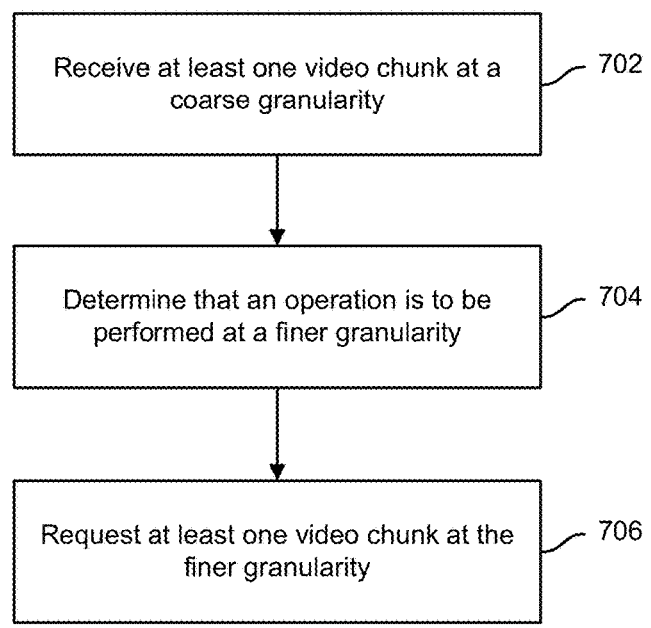
FIG. 7 illustrates an embodiment of a process for supporting fine granularity operations on a video stream.

FIG. 7 illustrates an embodiment of a process for supporting fine granularity operations on a video stream. In some embodiments the process shown in FIG. 7 is performed by client 180. The process shown in FIG. 7 can also be performed by other clients, including clients which use a single player instance instead of the multi-instance player described above.

The process begins at 702 when at least one video chunk is received at a coarse granularity. For example, at 702, client 180 requests from CDN 142 the Robin Hood movie, in chunks of length 30 seconds.

At 704, a determination is made that an operation is to be performed at a finer granularity and at 706 the video chunk having a finer granularity is requested. One example of such an operation is a seek operation, described above. Other example operations include adjusting a bitrate and switching to a new source. While these options can be performed at the boundary of the 30 second chunk boundaries, by switching to a 5 second chunk, the actions can be taken more quickly.

Typically, once the processing shown in FIG. 7 is complete, the client will request and revert back to receiving content in larger chunks.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
one or more computer processors configured to:
display, using a first instance of a video player, a first video stream from a first remote video streaming source;
while the first video stream is being displayed using the first instance of the video player in a first region of a display, process, by a second instance of the video player, a second video stream from a second remote video streaming source, wherein the processing performed by the second instance of the video player while the first video stream is being displayed using the first instance of the video player includes establishing a network connection with the second remote video streaming source and fetching video chunks from the second remote video streaming source;
cease display of the first video stream in the first region of the display and instead display, in the first region of the display, the second video stream at least in part by switching from playing a video chunk from the first video stream by the first instance of the video player to playing, by the second instance of the video player, a video chunk that was fetched from the second remote video streaming source while the first video stream was being displayed; and
subsequent to the switching, receive, by the second instance of the video player via the established network connection, additional video chunks from the second remote video streaming source;
while the second video stream is being displayed in the first region of the display using the second instance of the video player, process, by the first instance of the video player, a third video stream from a third remote video streaming source, wherein the processing performed by the first instance of the video player while the second video stream is being displayed in the first region of the display using the second instance of the video player includes establishing a network connection with the third remote video streaming source and fetching video chunks from the third remote video streaming source;
cease display of the second video stream in the first region of the display and instead display the third video stream at least in part by switching from playing a video chunk from the second video stream by the second instance of the video player to playing, by the first instance of the video player, a video chunk that was fetched from the third remote video streaming source while the second video stream was being displayed; and
a memory coupled to the one or more computer processors and configured to provide the one or more computer processors with instructions.

2. The system of claim 1 wherein displaying the first video stream comprises sequentially rendering one or more video chunks in a first set of video chunks obtained from the first remote video streaming source.

3. The system of claim 1 wherein the one or more computer processors are further configured to determine a switching point between the first and second video streams.

4. The system of claim 3 wherein the video chunk switching is performed according to the determined switching point.

5. The system of claim 3 wherein determining the switching point between the first and second video streams includes determining a time offset.

6. The system of claim 5 wherein the display of the second video stream is adjusted according to the time offset to reduce any perceived discontinuity that might result from switching from the first video stream to the second video stream.

7. The system of claim 5 wherein the time offset is derived from a first and second cue point included in the respective first and second video streams.

8. The system of claim 5 wherein the time offset is determined by matching a signature in the first and second video streams.

9. The system of claim 8 wherein the signature is based at least in part on a sequence of compressed frame sizes.

10. The system of claim 8 wherein the signature is based at least in part on a decompressed frame bitmap.

11. The system of claim 1 wherein the one or more computer processors are configured to process the second video stream in a hidden video player.

12. The system of claim 1 wherein the first video stream is a live video stream and wherein the one or more computer processors are configured to process the second video stream by adjusting a buffer length.

13. The system of claim 1 wherein the first video stream is a video-on-demand video stream and wherein the one or more computer processors are configured to process the second video stream by performing a series of pause and resume actions.

14. The system of claim 1 wherein the first video stream is received via a first protocol and wherein the second video stream is received via a second protocol and wherein the first and second protocols are different.

15. The system of claim 1 wherein one of the first video stream and second video stream is unencrypted and wherein the other of the first video stream and second video stream is encrypted.

16. The system of claim 1 wherein the first video stream and second video stream are both provided by a single network node.

17. The system of claim 1 wherein the first video stream and second video stream are respectively provided by two different network nodes.

18. The system of claim 1 wherein the first video stream is streamed at a first bitrate and the second video stream is streamed at a second bitrate and wherein the first and the second bitrate are different.

19. A method, comprising:
displaying, using a first instance of a video player, a first video stream from a first remote video streaming source;
while the first video stream is being displayed using the first instance of the video player in a first region of a display, processing, by a second instance of the video player and using one or more computer processors, a second video stream from a second remote video streaming source, wherein the processing performed by the second instance of the video player while the first video stream is being displayed using the first instance of the video player includes establishing a network connection with the second remote video streaming source and fetching video chunks from the second remote video streaming source;
ceasing display of the first video stream in the first region of the display and instead displaying, in the first region of the display, the second video stream at least in part by switching from playing a video chunk from the first video stream by the first instance of the video player to playing, by the second instance of the video player, a video chunk that was fetched from the second remote video streaming source while the first video stream was being displayed; and
subsequent to the switching, receiving, by the second instance of the video player via the established network connection, additional video chunks from the second remote video streaming source;
while the second video stream is being displayed in the first region of the display using the second instance of the video player, processing, by the first instance of the video player, a third video stream from a third remote video streaming source, wherein the processing performed by the first instance of the video player while the second video stream is being displayed in the first region of the display using the second instance of the video player includes establishing a network connection with the third remote video streaming source and fetching video chunks from the third remote video streaming source; and
ceasing display of the second video stream in the first region of the display and instead displaying the third video stream at least in part by switching from playing a video chunk from the second video stream by the second instance of the video player to playing, by the first instance of the video player, a video chunk that was fetched from the third remote video streaming source while the second video stream was being displayed.

20. The method of claim 19 wherein displaying the first video stream comprises sequentially rendering one or more video chunks in a first set of video chunks obtained from the first remote video streaming source.

21. The method of claim 19 further comprising determining a switching point between the first and second video streams.

22. The method of claim 21 wherein the video chunk switching is performed according to the determined switching point.

23. The method of claim 21 wherein determining the switching point between the first and second video streams includes determining a time offset.

24. The method of claim 23 wherein the display of the second video stream is adjusted according to the time offset to reduce any perceived discontinuity that might result from switching from the first video stream to the second video stream.

25. The method of claim 23 wherein the time offset is derived from a first and second cue point included in the respective first and second video streams.

26. The method of claim 23 wherein the time offset is determined by matching a signature in the first and second video streams.

27. The method of claim 26 wherein the signature is based at least in part on a sequence of compressed frame sizes.

28. The method of claim 26 wherein the signature is based at least in part on a decompressed frame bitmap.

29. The method of claim 19 further comprising processing the second video stream in a hidden video player.

30. The method of claim 19 wherein the first video stream is a live video stream and wherein the one or more computer processors are configured to process the second video stream by adjusting a buffer length.

31. The method of claim 19 wherein the first video stream is a video-on-demand video stream and further comprising processing the second video stream by performing a series of pause and resume actions.

32. The method of claim 19 wherein the first video stream is received via a first protocol and wherein the second video stream is received via a second protocol and wherein the first and second protocols are different.

33. The method of claim 19 wherein one of the first video stream and second video stream is unencrypted and wherein the other of the first video stream and second video stream is encrypted.

34. The method of claim 19 wherein the first video stream and second video stream are both provided by a single network node.

35. The method of claim 19 wherein the first video stream and second video stream are respectively provided by two different network nodes.

36. The method of claim 19 wherein the first video stream is streamed at a first bitrate and the second video stream is streamed at a second bitrate and wherein the first and the second bitrate are different.

37. A computer program product embodied in a non-transitory computer readable storage medium and comprising computer instructions for:
displaying, using a first instance of a video player, a first video stream from a first remote video streaming source;
while the first video stream is being displayed using the first instance of the video player in a first region of a display, processing, by a second instance of the video player and using one or more computer processors, a second video stream from a second remote video streaming source, wherein the processing performed by the second instance of the video player while the first video stream is being displayed using the first instance of the video player includes establishing a network connection with the second remote video streaming source and fetching video chunks from the second remote video streaming source;

ceasing display of the first video stream in the first region of the display and instead displaying, in the first region of the display, the second video stream at least in part by switching from playing a video chunk from the first video stream by the first instance of the video player to playing, by the second instance of the video player, a video chunk that was fetched from the second remote video streaming source while the first video stream was being displayed; and subsequent to the switching, receiving, by the second instance of the video player via the established network connection, additional video chunks from the second remote video streaming source;

while the second video stream is being displayed in the first region of the display using the second instance of the video player, processing, by the first instance of the video player, a third video stream from a third remote video streaming source, wherein the processing performed by the first instance of the video player while the second video stream is being displayed in the first region of the display using the second instance of the video player includes establishing a network connection with the third remote video streaming source and fetching video chunks from the third remote video streaming source; and ceasing display of the second video stream in the first region of the display and instead displaying the third video stream at least in part by switching from playing a video chunk from the second video stream by the second instance of the video player to playing, by the first instance of the video player, a video chunk that was fetched from the third remote video streaming source while the second video stream was being displayed.

\* \* \* \* \*

UNITED STATES PATENT AND TRADEMARK OFFICE
CERTIFICATE OF CORRECTION

PATENT NO. : 10,313,734 B1
APPLICATION NO. : 14/883533
DATED : June 4, 2019
INVENTOR(S) : Ningning Hu et al.

Page 1 of 1

It is certified that error appears in the above-identified patent and that said Letters Patent is hereby corrected as shown below:

On the Title Page

Page 3, Column 1, item [56], Line 16, delete "HO4N21/23435" and insert -- HO4N21/234354 --, therefor.

Signed and Sealed this
Twenty-fourth Day of December, 2019

Andrei Iancu
*Director of the United States Patent and Trademark Office*